United States Patent [19]

Hallstrom et al.

[11] 4,160,850

[45] Jul. 10, 1979

[54] SHELF-STABLE MIX FOR A SPREADABLE BUTTER-SUBSTITUTE

[75] Inventors: Curtis H. Hallstrom, Anoka; Ali R. Touba, Mound; Brian E. Glass, Plymouth; John V. Luck; George V. Daravingas, both of Edina, all of Minn.

[73] Assignee: General Mills, Inc., Minneapolis, Minn.

[21] Appl. No.: 788,566

[22] Filed: Apr. 18, 1977

Related U.S. Application Data

[63] Continuation of Ser. No. 605,478, Aug. 25, 1975, abandoned.

[51] Int. Cl.² .......................... A23D 3/00; A23D 5/00
[52] U.S. Cl. ...................................... 426/601; 426/604; 426/606; 426/611; 426/654
[58] Field of Search ................ 426/78, 285, 601, 603, 426/607, 611, 654, 604, 606

[56] References Cited

U.S. PATENT DOCUMENTS

| | | | |
|---|---|---|---|
| 1,432,699 | 10/1922 | Kinzer | 426/603 |
| 2,539,457 | 1/1951 | Metheny et al. | 426/603 X |
| 2,718,468 | 9/1955 | Jones et al. | 426/611 |
| 3,338,720 | 8/1967 | Pichel | 426/603 X |
| 3,490,918 | 1/1970 | Egan et al. | 426/611 |
| 3,661,795 | 5/1972 | Pardun | 426/654 X |

*Primary Examiner*—Robert A. Yoncoskie
*Attorney, Agent, or Firm*—Gene O. Enockson

[57] ABSTRACT

A mix useful for the consumer preparation of spreadable butter-substitutes also known as margarine products is disclosed.

20 Claims, No Drawings

SHELF-STABLE MIX FOR A SPREADABLE BUTTER-SUBSTITUTE

CROSS REFERENCE

This continuation application claims the benefit of the inventor's earlier application Ser. No. 605,478 filed Aug. 25, 1975, and now abandoned.

BACKGROUND OF THE INVENTION

Butter-substitutes or as they familiarily more familiarly called margarine products have been known for more than 100 years. Margarine itself was developed in the late 1860's by the French Chemist Me'ge. Me'ge was awarded U.S. Pat. No. 146,012 dated Dec. 30, 1873 for a margarine product formed from digested fatty beef tissues prepared by the action of pepsin in the presence of pig or beef stomachs. The oil for the margarine product prepared by Me'ge was the fat that was freed from the tissues and skimmed off at the surface. The oil was then cooled, grained and pressed to separate the soft portion which was mixed with salt and casein to give a product which upon chilling had about the consistency of a spreadable table fat, i.e., butter.

Due to the fact that butter-substitutes are normally less expensive than butter, considerable objections were raised to such products by the dairy industry. In fact, many states, notably Wisconsin and Minnesota, in response to dairy industry pressure promulgated stringent regulations on the sale of margarines. One such regulation made it illegal to sell margarines which were artificially colored. In order to maintain the margarine product market in these states many manufacturers resorted to packaging a ready to eat product to which the consumer added food coloring which was separately included with the uncolored margarine.

Most research in the field of margarines is more substantive than devising means to avoid prohibitive regulations. For instance, U.S. Pat. No. 1,432,699 to Kinzer issued October 17, 1922 described the use of milk or edible coconut oil as suitable fat sources for margarine. Considerable development work has also surrounded the emulsification of margarine products. Bertram in U.S. Pat. No. 2,552,706 issued May 8, 1951 discusses the use of monoglycerides and diglycerides as well as the reaction product of a fatty acid, a polyhydric alcohol and a aliphatic polycarboxylic acid as suitable emulsifiers for margarines. Other emulsifiers which are used to stabilize the mixture of oil and water in margarine products are esters of polyglycerols of higher fatty acids such as are described in U.S. Pat. No. 3,637,774 issued Jan. 25, 1972 to Babayan. Other emulsifiers which are described for use in butter-substitute products include non-ionic emulsifiers having a hydrophilic lipophilic balance of a specified ratio as described in U.S. Pat. No. 3,519,436 issued July 7, 1970 to Bauer et al.

Low fat margarine products, that is, those having a fat content of less than 60% by weight of the product have been proposed to lessen the fat intake of individuals on restrictive diets. One such low calorie product is described in U.S. Pat. No. 3,266,904 issued Aug. 16, 1966 to Duin et al. Recent development in margarine products include U.S. Pat. No. 3,338,720 issued Aug. 29, 1967 to Pichel for a butter-substitute which while emulsified remains a liquid over a wide temperature range.

The conventional preparation of margarine is a costly process involving a considerable degree of capital investment for the equipment used to prepare the margarine in stick or tub form. Additionally, it is often necessary in the warmer climates of this country to ship margarine under low temperature or refrigerated conditions. Moreover, margarine products also require refrigeration in the grocery store. The refrigeration is required to avoid bacterial growth which is promoted by the presence of protein and high water contents in conventional margarine products. Dietetic margarines which contain even higher amounts of water than normal margarine products are especially susceptible to bacterial growth for this reason.

It has now been found that margarine mixes may be prepared which are shelf stable under high temperature conditions. Moreover, the butter-substitute mixes of the present invention do not require the high capital investment needed to produce conventional margarine products. Other advantages of the present invention include the fact that salt-free products, reduced salt products, or low sodium salt products may be prepared according to the individual consumer's needs.

Throughout the specification and claims, percentages and ratios are by weight and temperatures are in degrees Celsius unless otherwise indicated.

SUMMARY OF THE INVENTION

The present invention describes a shelf-stable mix suitable for the consumer preparation of a spreadable butter-substitute product having from about 20% to about 80% by weight of an oil and from about 10% to about 80% by weight water said mix comprising:

(a) from about 0.01% to about 80% by weight of a water-in-oil emulsifier and (b) from about 2% to about 99% by weight of a hard fat such that the solid fat index in the product is from about 2% to 35% at 10° C., from about 1% to about 20% at 21° C., from about 0.9% to 15% at 27° C., from about 0% to 8% at 33° C. and from about 0% to 5% at 37.8° C.

The present invention also includes a pellet suitable for the consumer preparation of a spreadable butter-substitute product upon combination with water and oil wherein the pellet contains:

(a) from about 0.01% to about 80% by weight of a water-in-oil emulsifier; and (b) from about 2% to about 99% by weight of a hard fat having a solid fat index in the product of from about 2% to 35% at 10° C., from about 1% to about 20% at 21° C., from about 0.9% to 15% at 27° C., from about 0% to 8% at 33° C. and from about 0% to 5% at 37.8° C.

The present invention further describes a packet of components suitable for consumer preparation of a butter-substitute product having from about 10% to about 80% by weight water comprising:

(a) from about 2% to about 80% by weight of a hard fat component such that the solid fat index in the product is from about 2% to 35% at 10° C., from about 1% to about 20% at 21° C., from about 0.9% to 15% at 27° C., from about 0% to 8% at 33° C., from about 0% to 5% at 37.8° C.;

(b) from about 0.1% to about 30% by weight of a water-in-oil emulsifier, and;

(c) from about 5% to about 97% by weight of an oil.

The present invention further relates to a method for the consumer preparation of a spreadable butter-substitute product including the steps of combining:

(a) from about 0.01% to about 15% by weight of a water-in-oil emulsifier;

(b) from about 15% to about 80% by weight of an oil and hard fat having a solid fat index in the butter-substitute product of from about 2% to 35% at 10° C., from about 1% to 20% at 21° C., from about 0.9% to about 15% at 27° C. from about 0% to 8% at 33° C. and from about 0% to 5% at 37.8° C., and (c) from about 10% to about 80% by weight water then forming an emulsion of components (a), (b) and (c) by agitation and then refrigerating the resultant emulsion to form the butter-substitute product.

DETAILED DESCRIPTION OF THE INVENTION

The varying aspects of the present invention are designed to allow the consumer preparation of butter-substitutes which contain as a fat system from about 20% to about 80% by weight of an oil and from about 0.5% to about 20% by weight of a hard fat. The butter-substitutes with which the invention is concerned should also contain upon preparation about 0.01% to about 15% by weight of a water-in-oil emulsifier and from about 10% to about 80% by weight water.

The present invention as was previously stated comprises a shelf-stable mix which is used by the consumer to prepare a spreadable butter-substitute product. The butter-substitute product of the present invention is made by combining a hard fat with a water-in-oil emulsifier and optionally a liquid vegetable oil which is then packaged for preparation of the butter-substitute product by the consumer upon the addition of water and/or additional liquid vegetable oil.

The first component of the present invention is a hard fat which is generally described as an edible fat having a melting point in the range of from about 29° C. to about 66° C., preferably 35° C. to 50° C. The hard fat must have a solid fat index in the butter-substitute product of from about 2% to 35% at 10° C., from about 1% to about 20% at 21° C., from about 0.9% to 15% at 27° C., from about 0% to 8% at 33° C. and from about 0% to 5% at 37.8° C. The solid fat index is simply defined as a number giving the relative proportions of solid to liquid present in a given edible fat at any particular temperature. The solid fat index listed above is essential to the present invention. That is, the solid fat index given above at the upper limits is required so that the butter-substitute product prepared in accordance with the present invention will have desirable melt-in-mouth characteristics. Stated otherwise, if the butter-substitute product had a significantly higher proportion of hard fats as indicated by the solid fat index then the resultant product would leave a tallowy or waxy feel in the mouth of the consumer and thus be unsuitable.

The lower temperatures and the corresponding solid fat index are required in the present invention to ensure that the butter-substitute product upon preparation by the consumer will contain sufficient fat crystal nuclei to cause the product to become semi-solid. The butter-substitute product should be a semi-hard emulsion at room temperature but not soupy or brick hard. The intermediate ranges for the solid fat index of the hard fat as listed above are necessary to obtain a proper transition of the hard fat between the higher and lower temperatures. While a hard fat has the proper higher and lower solid fat indexes at 10° C. and 37.8° C. it is still necessary for the nuclei effect and the taste of the butter-substitute product that the interior limits for the solid fat index be met.

A definite borderline between hard fats and oils as later discussed is difficult to draw as both materials are triglycerides but the fatty acid radicals may differ substantially in chain lengths and the degree of saturation. To complicate matters further, the solid fat index which is the primary distinguishing feature between hard fats and liquid oils is dependent on the composition of the given source material. That is, a hard fat and a liquid vegetable oil may be blended to form a homogenous mixture having a solid fat index which approximates the weighted mean of the hard fat and the liquid oil. Moreover, the liquid oils, particularly vegetable oils, are often hydrogenated to decrease the unsaturation in the oil. Upon substantial hydrogenation most vegetable oils become solid and are suitable as the hard fat component of the present invention. Alternatively, a partially hydrogenated oil may be prepared such that the oil and hard fat are obtained from the same source material.

With the foregoing in mind, the following materials are suitable sources of hard fats for the present invention either initially or as a hydrogenated or partially hydrogenated material. The preferred hard fat is hard butter or butter fat. Examples of suitable hard butters include Cirol, Aratex, Kaomel, and KLX which are trade named products of Durkee. Additional Durkee hard butters which may be used in the present invention include PARAMOUNT B,C,H,X,XX.

The vegetable oils which are suitable in either hydrogenated or unhydrogenated forms as the hard fat component are the triglycerides of fatty acids. The fatty acids are predominately mixed but may be identical on the glycerol backbone. That is, the carbon chains attached to the glycerol backbone may be the same or different lengths and may be saturated or unsaturated. The fatty acids include butyric, caproic, caprylic, capric, undecanoic, lauric, tridecanoic, myristic, myristoleic, pentadecanoic, palmitic, palmitoleic, margaric, margaroleic, stearic, oleic, linoleic, linolenic, nonadecanoic, arachidic, gadoleic, eiconsadienoic, arachidonic, behenic, erucic, docosadienoic, and lignoceric.

The present invention requires that the product be formulated with an oil or nonhard fat oleo component. As it is later described, the oil component may be included with the hard fat and emulsifier in the packet aspect of the present invention or may be separately added by the consumer during preparation of the butter-substitute product by combination with the hard fat and emulsifier in the pellet aspect of the present invention.

The oils which may be used without limitation upon the form of the product of the present invention include groundnut oil, Babassu, citrusseed oil, corn oil, wheat germ, cottonseed, soybean oil, palm kernel oil, coconut butter, coconut oil, cokune oil, oat oil, safflower oil, peanut oil, palm oil, tobaccoseed oil, and sunflower seed oil as well as mixtures of foregoing materials. In fact it is particularly desirable when using an oil such as cocoa butter which has a melting point of from about 30° to 35° C. to blend that material with a lower melting oil in a large proportion to ensure that the solid fat index of the butter-substitute product is within the proper range.

Particularly preferred oils are corn oil, soybean oil, peanut oil, coconut oil, cottonseed oil, safflower oil, peanut oil, rapeseed oil, sunflowerseed oil, wheat germ oil, palm oil, tobaccoseed oil and mixtures thereof. More preferably the oil is a member selected from the group consisting of corn oil, coconut oil, soybean oil, palm oil, and cottonseed oil and mixtures thereof.

The next element of the present invention is a water-in-oil emulsifier. The emulsifier is used in the present invention to increase the ease of blending the fat soluble and watersoluble ingredients in the formation of the butter-substitute product. Emulsifiers may be thought of as surface active substances which are used to reduce the interfacial tension at the boundry between the water and oil phases.

The emulsifiers of the present invention include any suitable water-in-oil emulsifier which may be used to prepare spreadable or plastic butter-substitute products. Exemplary emulsifiers include the monoglycerides and diglycerides of fatty acids, polyglycerol esters of fatty acids, lecithin, and sterols and mixtures thereof. The fatty acid portion of the monoglycerides, diglycerides and polyglycerol esters are for the most part, identical to the listing of the fatty acid components under the heading of hard fat previously discussed. Preferred emulsifiers are phytosterols, which denotes that the sterol is derived from a plant source. An especially preferred phytosterol emulsifier usable in the present invention is General ® 122 which is a mixture comprising approximately 58% sitosterol, 29% campesterol, and 5% stigmasterol produced by General Mills Chemicals, Inc. It is noted, however, that it is not necessary to utilize such a precise blend of phytosterols and that all phytosterols alone or in combination with one another are suitable as the water-in-oil emulsifier of the present invention. Aside from the previously mentioned sterols other materials such as brassicasterol and ergosterol are also suitable emulsifiers for the present invention.

It was previously stated by the applicants's, that the mono- and diglycerides had been found unsuitable in the present invention as they would not form stable emulsions under the processing aspects described in the parent application. It is now been discovered that mono- and diglycerides are suitable emulsifiers if the amount of the hard fat component is increased slightly or if the butter-substitute product is cooled slightly while the emulsion is being formed or prior to the emulsion formation.

The water-in-oil emulsifier will be present in the butter-substitute product at a level of from about 0.1% to about 15% by weight. In the mix aspect of the present invention, the emulsifiers are thus present at a level of from about 0.01% to about 80%, preferably 0.1% to about 50%, and most preferably about 0.2% to about 20% by weight both figures being given as a proportion of the shelf-stable mix. It should be noted that in at least one case additional emulsifier benefit may be gained by using an oil or hard fat which naturally contains emulsifier. One such oil which contains a large proportion of phytosterols which are suitable as emulsifiers in the present invention is wheat germ oil.

The last component required to make the buttersubstitute product of the present invention is water. Most conveniently, the water is added by the consumer to produce the butter-substitute product in the home. The water is present in the butter-substitute product at from about 10% to about 80%, preferably about 25% to about 70% by weight. It is noted, however, that water may be included in the mix, pellet or packet aspects of the present invention either as bound water or as added water in an amount not to exceed that required for the preparation of the butter-substituted product.

It is also noted that the water added to prepare the butter-substitute need not be tap water. That is, several variations of the present invention would allow the consumer to utilize the mix, pellet or packet form of the present invention to manufacture butter-like products which would not be used as a typical margarine. That is, various products may be made from the mix, packet or pouch products of the present invention by utilizing the water found in a can of cheddar cheese soup to prepare a cheese sauce. Other related products which could be similarily made include a strawberry spread by utilizing frozen strawberries and the sauce therein as a source of the required water. A tomato topping is made according to the present invention by utilizing tomato juice and an onion dip is prepared from onion and garlic juice and utilizing a smaller portion of added tap water. If a high protein product is desired milk may be used as the source of the water.

Several additional ingredients may be incorporated into the products of the present invention. Butter-substitute products desirably contain Vitamins A and B alone or in combination with one another at levels in the butter-substitute product of not less than 15,000 international units and 1500 international units per pound respectively.

Other recommended ingredients which may be included are edible protein such as liquid condensed or dry whey, whey modified by the reduction of lactose and/or minerals, nonlactose containing whey components, albumin, casein, caseinate, vegetable proteins, and soy protein isolate. Other materials include nutritive carbohydrate sweeteners, artificial sweeteners, Vitamins E and C, coloring additives such as Provitamin A (beta-carotene), diketone flavor enhancers, acidulants, and alkalizers. Preservatives may also be added to the butter-substitute products of the present invention in their various forms including calcium disodium EDTA, various gallates, BHT, BHA, as well as ascorbyl palmitate and stearate and stearyl and isopropyl citrates. Recommended amounts of the foregoing additive components may be found in 21 CFR 45.1. It is recommended, however, that where proteins are added to the mix, pellet or packet aspects of the present invention that water be substantially excluded to avoid undesirable bacterial growth. If water is present in substantial amounts when protein is present additional amounts of preservative or special handling conditions such as regrigeration should be employed to hinder bacterial growth. The compositions of the present invention are also preferably packaged under sterile conditions for the foregoing reason even if proteins are not present.

An additional desirable ingredient is a salt which is either sodium or potassium chloride or mixtures thereof preferably in an amount of from about 0.1% to about 5% by weight of the butter-substitute product. The salt is most desirably added by the consumer to facilitate dietary restrictions but may be added in any of the packaged forms by the manufacturer. Where the form of the butter-substitute mix is solid such as in the pellet, the salt may be added without any serious consideration of product asthetics. However, when the product form of the butter-substitute mix is formulated in the packet as described hereinafter, it is desirable that the salt be added by the consumer not only for dietary reasons but also due to the fact that the salt will not dissolve in the oleo fraction within the packet and thus the contents of the packet will appear gritty and the salt may not be easily removed from the packet. This difficulty may, however, be alleviated by including a small proportion of water approximating from about 1% to about 10% by weight of the components in the packet to dissolve or at least partially solublize the salt to improve the appearance of the product. As was previously stated, however, a significant advantage of the present invention is that it allows the individual consumer to add salt to individual taste if at all. The present invention is particularily beneficial to institutional kitchens such as hospitals where the restrictive diets of patients may dictate low sodium content diets or the total replacement of sodium chloride with potassium chloride. It should also be mentioned at this point that another significant advantage of the present invention is that under conditions as previously described where bacterial growth is not a factor that the butter-substitute mixes of the present invention require no refrigeration and thus may be stored indefinitely in, for example, civil defense shelters or for use in military operations.

The preparation of the butter-substitute mix in its various forms is now discussed. It is first noted that the form of the product may be either solid or liquid depending upon the composition of the various ingredients in the butter-substitute mix. The solid forms of the product include flakes, granules, powder, chunk, and the preferred solid form the pellet. In preparing the solid form of the butter-substitute mix the emulsifier and hard fat are formed together as a mixture and solidified. Most conveniently the hard fat is heated to a temperature above its melting point but below its smoke point, i.e., the temperature at which the fat begins to break down. The emulsifier is then added to the melted fat and mixed until a clear solution is obtained. Most conveniently the hard fat is heated to a temperature of about 110° C. and the emulsifier is then added. The mixture is next cooled to solidification by any convenient means. A typical method of formulating the granule or flake aspect of the solid butter-substitute mix includes spray drying the mixture to a convenient particle size. For the chunk aspect the butter-substitute mix, the hard fat and the emulsifier are cooled and then cut to the desirable size. In any event the mix should be prepared such that the contents are intimate to avoid separation in handling.

The pellet aspect of the present invention is preferably formed by pressing the components of the pellet while they are in a semi-molten state and then allowing the pellet to cool to the ambient temperature. While it is not essential, it is highly desirable that the hard fat and emulsifier be intimately mixed prior to processing it into the solid form of the invention to ensure that the butter-substitute mix does not separate into the emulsifier and hard fat during its shelf life. This is particularily important in that the emulsifier will ordinarily form a small proportion of the solid butter-substitute and thus if it were to separate the finished product could contain an insufficient amount of emulsifier to form the spreadable butter-substitute product. The pellet form of the invention which is designed for the preparation of definite quantities of the butter-substitute product overcomes the possibility of loss of the emulsifier by fixing it in the pellet. When the butter-substitute mix of the present invention is in the pellet form it is preferable that the pellet be prepared so that it has a weight of from about 1 to about 80 grams, preferably from about 10 to about 50 grams. This size pellet is most convenient for the consumer to utilize in the preparation of the butter-substitute product in one pound (454 grams) quantities.

The solid forms of the butter-substitute mix may be packaged in any convenient form and maintained stable with or without refrigeration. The powder or granule forms of the present invention are conveniently packaged in an oil resistant box and the same holds true for the chunk form of the solid butter-substitute product. The pellets of the present invention may also be packed in a box or may be individually wrapped in tin foil or a plastic coating. A particular advantage to preparing the butter-substitute product in the form of a pellet is that if pressure is applied in forming the pellet the ingredients therein are maintained in an intimate state even above the melting point of the lowest melting component of the pellet.

In any of the solid forms of the invention such as the pellet or granular mode, the amount of the emulsifier is conveniently utilized at from about 0.01% to about 80%, preferably about 0.1 to about 50% by weight of the mix. The level of the hard fat employed in the mix is conveniently from about 2% to about 99%, preferably about 4% to about 80% by weight. Particularily convenient pellet forms of the mix include 80% hard fat and 20% phytosterol emulsifier especially where the solid fat index of the hard fat in the pellet is at least 50 at 10° C.

When the butter-substitute mix of the present invention is in liquid form, it is contemplated that in addition to the hard fat and the emulsifier that the oil component is present. In preparing the packet of components, the emulsifier and the hard fat tend to solublize in the liquid oil and thus lower heat requirements are needed to provide a homogenous mixture of the components which are placed in the packet. Moreover, as the emulsifier which is ordinarily the smallest component by weight of the butter-substitute product is dissolved in a large volume of oil in the packet the opportunity for loss of the emulsifier is minimized. Thus the packet of components provides the most reproducible manner of preparing the butter-substitute product with little chance for consumer error.

Due to the fact that some oils become rancid it is preferred that the contents of the packet be in a sterile condition to minimize this tendency. The packet conveniently contains the components of the butter-substitute mix at levels of from about 50 grams to 2 kilograms, preferably 100 grams to 1000 grams for the preparation of from 1 to 5 pound (2270 grams) increments of the butter-substitute finished product.

The composition of the packet is conveniently set at from about 0.1 to about 30%, preferably about 0.2% to about 20% by weight emulsifier. The hard fat in the packet is desirably from about 2% to about 80%, preferably about 3% to about 50% of the packet mix. The level of the oil in the packet is at about 5% to about 97%, preferably about 10% to about 90% by weight of the mix.

The packet form of the butter-substitute mix may be made of any convenient material. It is generally considered necessary that the packet be air tight and free of oxygen in the headspace to avoid oxidative rancidity of the components. The packaging material should be oleophobic to avoid leakage of the ingredients. The packet may be of such diverse materials as metal foil, nylon, Saran, polypropylene, polyester, Surlyn, polyvinyl chloride or polyethylene plastic films. In its preferred form, the packet is transparent or translucent in that it has been generally found that the consumer desires to view the contents of any package to be used in the kitchen. Aluminum or tin foil packages are, however, suitable even though they are an opaque material. If a transparent package is used and salt is included in the packet it is desirable to include a portion of water to ensure that the salt is solublized. Alternatively, translucent packets may be utilized to lessen the perception of immiscible ingredients in the packet.

Utilization of the butter-substitute mix represents another important aspect of the present invention. Any of the product forms of the butter-substitute mix will be packaged with appropriate directions on the utilization of the product. Basically in the case of any of the solid forms of the mix, the emulsifier and the hard fat therein will be melted in a pan by the consumer. Thereafter, the requisite quantity of oil and water will be mixed with the melted mix. The resultant mixture containing the hard fat, emulsifier, oil and water is then agitated with a conventional home mixer such as a MixMaster. The mixture is agitated until all of the water is emulsified with the oil phase. At this point, the hard fat has served as a crystallization nuclei and the product will have the texture of very soft butter. The consumer is then instructed to place the prepared butter-substitute into containers and to refrigerate the product to retard spoilage. The product is, however, ready to use following the mixing (agitation) step.

The packet form of the present invention has been found to be most convenient in that all of the liquid oil which the consumer needs is incorporated into the packet. At this point the consumer adds only water, preferably cold, to the mix. This mixture is then agitated as in the case of the solid forms until all of the water is taken up into the oil phase. The product is then refrigerated as previously stated. An additional advantage to using the packet form of the present invention over the solid form is that no heating step is required prior to adding in the water. Alternatively, the packet may be prepared to allow the addition of some of the oil by the consumer.

The present invention as previously stated also describes a method for the consumer preparation of the butter-substitute product. This aspect of the present invention describes the combination of a water-in-oil emulsifier, a mixture of oil and hard fat having a prescribed solid fat index as previously listed and water. The method includes the steps of having the consumer combine the foregoing ingredients followed by thorough mixing with a home mixer or blender and then refrigeration of the resulting butter-substitute product. The foregoing aspect of the present invention is extremely valuable in that the consumer provides a great deal of the labor involved in preparing the product. In contrast to conventional butter or margarine processing, the present invention does not require refrigeration until after the butter-substitute product is fully mixed, and then only requires refrigeration for storage. That is, costly equipment such as Votators used to make conventional margarines accomplish no more than what the consumer can conveniently do in the home at considerably less expense using the mix of the present invention.

The following are examples of the present invention:

EXAMPLE I

A pellet suitable for the preparation of a butter-substitute product is prepared by mixing 15.45 parts of phytosterols sold under the trademark of Generol ® 122. The phytosterols are a mixture of 58% sitosterol, 29% campesterol and 5% stigmasterol. The remainder of the pellet is 82.73 parts of hard butter having a Wiley melting point of 48° C., 0.08 parts beta-carotene coloring blend (30% in vegetable oil), and 1.45 parts butter flavoring. The resultant mixture was heated until melted and the mixture was then cooled and molded into a pellet weighing 19.22 grams.

The pellet was then wrapped in tin foil and stored for a period of 180 days to approximate the normal shelf life of the product. The stored pellet along with a freshly prepared pellet were used to prepare two butter-substitute products. The butter-substitute product was prepared in each instance by melting the pellets in a small pan and then adding ⅝ cups of corn oil (146.7 grams) with the melting pellet. The melted mixture of the pellet and the corn oil was then at a temperature of about 40° C. One and one-third cups (318 grams) of ice water at about 4° C. was combined with the melted pellets and corn oil. The resulting temperature of the combination was about 18° C. Two teaspoons of table salt (10 grams) were added to the liquid mixture. This mixture was then formed into the butter-substitute product through emulsifying by mixing at low speed with a household mixer for about one minute to effect a single phase emulsion. The single phase emulsion was then blended at high speed with the household mixer for about five minutes at which time stiff peaks formed in the product.

The finished butter-substitute product was then refrigerated to completely stabilize the emulsion. The composition of the finished butter-substitute was 64.6% water, 29.8% corn oil, 3.2% hard butter, 1.6% salt, 0.6% phytosterol and the balance flavoring and coloring. Both of the pellets formed butter-substitute products which exhibited a smooth spreadable character and were fresher in flavor than conventional margarines purchased on the same day. The foregoing example may be varied by utilizing an equivalent amount of a monoglyceride or diglyceride in place of the phytosterol. Alternatively, the emulsifier may be a polyglycerol ester of a fatty acid such as Santone 10-10-0 from Durkee.

EXAMPLE II

The packet aspect of the present invention is demonstrated by utilizing a mixture of 48.8% margarine oil, 48.8% corn oil, and 2% of the phytosterol described in Example I. The balance of the formulation is flavoring and coloring. 150 grams (⅝ cup) of the mixture was placed in a sealed polyethylene packet and was then stored for 180 days. A second identical freshly prepared packet was then made up. The freshly prepared packet of the butter-substitute mix was allowed to cool to room temperature to ensure crystal formation of the hard fat supplied by the margarine oil.

Each packet was then placed in a mixing bowl with one and one-third cups of ice water containing two teaspoons of table salt. The combined ingredients were mixed for one minute at a low speed using a household mixer and then for five minutes at high speed. Both products formed a stable emulsion upon refrigeration and compared favorably in texture and were superior in taste to a conventional margarine product purchased at a local grocery store.

EXAMPLE III

A spreadable butter-substitute product is prepared in the home by combining 128 grams of Crisco oil (liquid soy bean oil), 296 grams of cold water at 10° C., 2.4 grams of a distilled monoglyceride and 0.6 gram soya lecithin as emulsifiers and as hard fat 18.5 grams of Paramount XX. The hard fat, emulsifier, and the oil are the mixed thoroughly and heated to 55° C. and allowed to cool to 20° C. The cold water is then added and the product was mixed for about one minute on low speed to form a single phase emulsion and then for five minutes at high speed to fully disperse the water in the oil phase. Following mixing, the product is emptied into any suitable container and placed in a refrigerator for storage. The resultant product forms an excellent spreadable butter-substitute product which is fresher than a conventionally purchased margarine product.

EXAMPLE IV

A shelf-stable mix suitable for the consumer preparation of a butter-substitute product is formed by melting 18.5 grams of hard fat (Paramount XX) and 2.6 grams of the phytosterols of Example I. The resultant mixture is melted and blended to ensure that the ingredients are substantially homogenous followed by solidification. The intimate mixture of the product is then granulated into particles of approximately 1 millimeter.

A butter-substitute product is then prepared from 19 grams of the granulated mix according to the directions given in Example I. An excellent tasting butter-substitute product is thereby obtained.

EXAMPLE V

A series of transparent packets containing the butter-substitute mix are prepared by combining 146 grams of any one of the mixtures one through five shown in the table below with 10 grams of a diglyceride emulsifier. The fat blend is shown below with the solid fat index indicated for the finished product upon combination with 318 grams of cold water.

The butter-substitute products are prepared as described in Example II to form a spreadable butter-substitute product of excellent flavor. This example may be varied by including water and salt within the packet such that the water level is 10% and the salt is at 10 grams. Upon preparation of the butter-substitute product, the consumer added water is reduced to maintain a constant level in the product. The packaging material for the packet is a polyvinyl chloride material with a slight haze to mask the granular appearance of any undissolved salt in the oil phase. Alternatively, a more shelf-stable product is obtained by omitting the water within the packet and then using tin foil to avoid the appearance of the gritty salt within the packet.

| FAT BLEND | SOLID FAT INDEX | | | | |
|---|---|---|---|---|---|
| | 10° C. | 21° C. | 27° C. | 33° C. | 37.8° C. |
| 1. 50 percent corn oil and 50 percent margarine oil | 12.8 | 6.7 | 3.8 | 0.4 | 0 |
| 2. 90 percent corn oil and 10 percent hard butter (Paramount XX) | 4.3 | 2.1 | 1.8 | 1.3 | 0.7 |
| 3. Margarine oil | 28 | 16 | 12 | 3 | 0 |
| 4. 80 percent corn oil and 20 percent hard fat | 13.6 | 11.6 | 10.4 | 6.0 | 3.8 |
| 5. 95 percent corn oil and 5 percent hard fat | 3.4 | 2.9 | 2.6 | 1.5 | 0.95 |

EXAMPLE VI

A packet of a butter-substitute mix is prepared by heating 18.5 grams of hard butter (Paramount XX, Durkee), 128 grams soy bean oil (Crisco), 1.8 grams Myverol 18-98 (Eastman Chemicals monoglyceride), 0.6 gram Myverol 18-00 monoglyceride, 0.6 liquid soya lecithin, 0.3 grams butter flavor, and 0.01 grams of color. The mix is then packaged in a Surlyn-polyethylene packet and cooled rapidly to 0° C. This is accomplished by placing the individual packet in an ice bath for about 15 minutes to ensure uniform crystallization of the hard fat component throughout the oil. The mix is then ready for preparation by the consumer upon the combination with one and one-quarter cups of water and two teaspoons of salt (10 grams). The butter-substitute product is then prepared by mixing as previously described to yield an excellent smooth spread which contains only 40% of the calories in a regular margarine product.

EXAMPLE VII

A butter-substitute mix in a packet is prepared by melting 10 parts of hard butter (Durkee XX) and blending it with 90 parts of wheat germ oil. The wheat germ oil contains about 3% by weight of phytosterols which are sufficient to emulsify the butter-substitute product prepared by the consumer. The mix is placed in packets containing 130 gram portions and cooled. The mix is combined by the consumer with one and one-third cups of water and one teaspoon salt and prepared as in Example V. This product has the advantage of forming a naturally emulsified margarine with a natural yellow color and only 35% of the calories of a regular margarine product.

EXAMPLE VIII

A butter-substitute mix is prepared for use in a packet by heating 73 grams of stick-type margarine oil (Durkee), 1.9 grams Generol ® 122 and 0.01 grams of color. The mix is then cooled to ensure uniform crystallization of the emulsifier and the hard fat present in the margarine oil and packaged. The packet is formed from a light weight aluminum foil and sealed. It is noted that the margarine oil is obtained from the manufacturer such that it contains the requisite amount of hard fat and oil components thus easing the manufacture of the packet.

In use the packet is heated in hot water (80° C.) to melt the fat crystals and the product is then cooled to room temperature without recrystallization. The consumer adds one-third of a cup of Crisco oil, one and one-quarter cups of cold water, and two teaspoons of salt to the contents of the packet. This mixture is then blended using a MixMaster for one minute on slow speed and five minutes on high speed. The resultant product is an excellent tasting diet margarine containing 60% fewer calories than regular margarines. It is observed that a more stable product is obtained when the fat crystals are melted such that the product of the packet becomes essentially clear before mixing in the water.

EXAMPLE IX

A packet containing a mix useful for making an all-purpose spreadable butter-substitute product with 25% fewer calories than regular margarine is prepared by blending 70 parts of vegetable oil (safflower), 22 parts of hard butter, and 6 parts Santone 10-10-0 (a polyglycerol ester from Durkee) together. The mixture which weights 273 grams is heated until all of the components are melted and then rapidly cooled to ensure crystallization of the hard fat. After purchase by the consumer the mix is combined with three-quarters of a cup of water and mixed for five minutes in a MixMaster (one minute on low speed, four minutes on high speed). The resulting spreadable all-purpose butter-substitute product not only offers reduced calories but is also functional in cooking and baking uses.

EXAMPLE X

A series of butter-substitute mixes are prepared and packaged in Surlyn-polyester packets by combining 13.1% hard butter, 85.4% Crisco oil, 1.35% phytosterol (Generol® 122) and a minor amount of flavor and coloring ingredients. The ingredients are heated until melted and then rapidly cooled to form an intimate mixture then packaged at 140 grams per packet. The following table shows a "recipe" for the manufacture of diet, all-purpose and regular table spreads.

TABLE II

|  | Diet | All-Purpose | Regular |
|---|---|---|---|
| Packets of Mix | 1 | 2 | 3 |
| Water | 1¼ cup | ¾ cup | ½ cup |
| Salt (optional) | 2 teaspoons | 2 teaspoons | 2 teaspoons |
| Relative density | 0.93 | 0.83 | 0.64 |
| Yield - Tbsp/lb. | 33 | 37 | 48 |

The density of the diet product is approximately equal to that of commercially available diet margarines. The all-purpose and regular margarine products prepared from more than one packet represent a more whipped product with an increased yield (number of servings) per pound.

What is claimed is:

1. A packaged shelf-stable mix suitable for the consumer preparation of a spreadable butter-substitute product upon the addition of water or water and an oil, such butter-substitute product having an oil content of from about 20% to about 80% by weight and a water content of from about 10% to about 80% by weight, said mix comprising:
   (a) from about 0.01% to about 80% by weight of an emulsifier capable of forming a water-in-oil emulsion;
   (b) from about 2% to about 99% by weight of a hard fat having a melting point of from about 29° C. to about 66° C. such that the solid fat index in the butter-substitute product prepared from said mix is from about 2% to 35% at 10° C., from about 1% to about 20% at 21° C., from about 0.9% to 15% at 27° C., from about 0% to 8% at 33° C. and from about 0% to 5% at 37.8° C.; and
   (c) from 0% to about 97% by weight of an oil with the proviso that when the oil is present in an amount of about 5% to about 97% by weight, the emulsifier is present in an amount of from about 0.1% to about 30% by weight and the hard fat is present in an amount of about 2% to about 80% by weight.

2. The mix of claim 1 wherein the emulsifier is selected from the group consisting of monoglycerides, diglycerides, polyglycerol esters of fatty acids, lecithin, and sterols and mixtures thereof.

3. The mix of claim 1 wherein the oil is selected from the group consisting of corn oil, soybean oil, cottonseed oil, safflower oil, peanut oil, rapeseed oil, sunflowerseed oil, wheat germ oil, palm oil, coconut oil, tobaccoseed oil palm kernel oil, and mixtures thereof.

4. The mix of claim 2 wherein the emulsifier is present in said mix in an amount such that the emulsifier will be present in an amount of from about 0.1% to about 15% by weight in the said butter substitute product prepared from said mix.

5. The mix of claim 1 wherein the melting point of the hard fat is from about 35° C. to 50° C.

6. The mix of claim 3 wherein the oil is corn oil.

7. The mix of claim 1 additionally containing a salt selected from the group consisting of sodium and potassium chloride and mixtures thereof, said salt being present in an amount sufficient to improve the taste of a butter-substitute product prepared from said mix.

8. A packaged pellet suitable for the consumer preparation of a spreadable butter-substitute product upon the addition of water and an oil, such butter-substitute product having an oil content of from about 20% to about 80% by weight and a water content of from about 10% to about 80% by weight, said pellet consisting essentially of:
   (a) from about 0.01% to about 80% by weight of an emulsifier capable of forming a water-in-oil emulsion; and
   (b) from about 2% to about 99% by weight of a hard fat having a melting point of from about 29° C. to about 66° C. such that the solid fat index in the butter substitute product prepared from said pellet is from about 2% to 35% at 10° C., from about 1% to about 20% at 21° C., from about 0.9% to 15% at 27° C., from about 0% to 8% at 33° C. and from about 0% to 5% at 37.8° C.

9. The pellet of claim 8 wherein the emulsifier is selected from the group consisting of monoglycerides, diglycerides, polyglycerol esters of fatty acids, lecithin, and sterols and mixtures thereof.

10. The pellet of claim 8 wherein the hard fat has a melting point of from about 35° C. to 50° C.

11. The pellet of claim 8 additionally containing a salt selected from the group consisting of sodium and potassium chloride and mixtures thereof, said salt being present in an amount sufficient to improve the taste of a butter-substitute product prepared from said pellet.

12. The pellet of claim 8 wherein said emulsifier is a member selected from the group consisting of monoglycerides, diglycerides, polyglycerol esters of fatty acids, lecithin and sterols and mixtures thereof.

13. A packaged shelf-stable mix suitable for consumer preparation of a spreadable butter-substitute product upon the addition of water such butter-substitute product having a water content of from about 10% to about 80% by weight, said packaged mix comprising a sealed package containing a composition consisting essentially of
   (a) from about 2% to about 80% by weight of a hard fat component having a melting point from about 29° C. to about 66° C. such that the solid fat index in a butter-substitute produce prepared from said mix is from about 2% to 35% at 10° C., from about 1% to about 20% at 21° C., from about 0.9% to 15% at 27° C., from about 0% to 8% at 33° C., from about 0% to 5% at 37.8° C.;
   (b) from about 0.1% to about 30% by weight of an emulsifier capable of forming a water-in-oil emulsion; and
   (c) from about 5% to about 97% by weight of an oil.

14. The packaged mix of claim 13 wherein the oil is selected from the group consisting of corn oil, soybean oil, cottonseed oil, safflower oil, peanut oil, rapeseed oil, sunflowerseed oil, wheat germ oil, palm oil, coconut oil, tobaccoseed oil, palm kernel oil, and mixtures thereof.

15. The package mix of claim 13 wherein the hard fat has a melting point of from about 35° C. to 50° C.

16. The packet of claim 13 wherein the emulsifier is selected from the group consisting of monoglycerides, diglycerides, polyglycerol esters of fatty acids, lecithin, and sterols and mixtures thereof.

17. The package mix of claim 13 additionally containing a salt selected from the group consisting of sodium and potassium chloride and mixtures thereof, said salt being present in an amount sufficient to improve the taste of a butter-substitute product prepared from the composition in said package.

18. The packaged mix of claim 13 wherein the weight of the composition in the package is from about 50 grams to about 2 kilograms.

19. The packaged mix of claim 13 wherein the material of the package is transparent.

20. The packaged mix of claim 13 wherein the emulsifier is present in an amount of from about 0.2% to about 20% by weight, the hard fat is present in an amount of from about 3% to about 50% by weight and the oil is present in an amount of about 10% to about 90% by weight.

* * * * *

UNITED STATES PATENT AND TRADEMARK OFFICE
CERTIFICATE OF CORRECTION

PATENT NO. : 4,160,850
DATED : July 10, 1979
INVENTOR(S) : Curtis H. Hallstrom et al.

It is certified that error appears in the above-identified patent and that said Letters Patent are hereby corrected as shown below:

Column 1, line 11, after "they", delete "familiarily" and insert -- are --.
Column 5, line 35, "applicants's" should read -- applicants' --.
Column 6, line 48, "regrigeration" should read -- refrigeration --.
Column 10, line 14, "melting" should read -- melted --.
Column 11, line 3, "the" should read -- then --.
Column 15, line 3, "packet" should read -- packaged mix --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks